United States Patent Office 3,562,790
Patented Feb. 9, 1971

3,562,790
TRI-COMPONENT POLY-PROPYLENE BLEND
AND METHOD
Harry W. Coover, Frederick B. Joyner, and Doyle A.
Weemes, Kingsport, Tenn., assignors to Eastman Kodak
Company, Rochester, N.Y., a corporation of New
Jersey
No Drawing. Continuation-in-part of applications Ser. No.
477,029, Aug. 3, 1965, and Ser. No. 564,049, July 11,
1966. This application June 6, 1968, Ser. No. 734,884
Int. Cl. C08f 29/12, 37/18
U.S. Cl. 260—876
20 Claims

ABSTRACT OF THE DISCLOSURE

Polyolefinic tri-component blends capable of being molded into products of excellent clarity and resistance to blushing, comprising (A) from about 65 to about 96 percent by weight of a crystalline polymer selected from block- and copolymers of propylene with less than 10% by weight alpha-olefin; (B) from about 2 to about 15 percent by weight of a polymer of ethylene selected from polyethylene and copolymers of ethylene and less than 5% by weight of alpha-olefin of less than ten carbon atoms; and (C) from about 2 to about 20 percent by weight of a terpolymer of ethylene, propylene and up to 10% by weight of an unsaturated hydrocarbon containing at least 1 double bond, said amorphous terpolymer having an ethylene content of 20 to 80%.

---

This application is a continuation-in-part of applicants' application S.N. 477,029 filed Aug. 3, 1965, now abandoned, and applicants' copending application S.N. 564,-049 filed July 11, 1966, now abandoned.

This invention relates to new polypropylene-containing compositions with certain enhanced properties and their method of preparation. More particularly, this invention concerns polypropylene blend compositions having improved clarity, little or no tendency to blush, excellent impact and other desirable properties.

As is known in the industry, there are a number of polyolefin materials available such as polypropylene and polyethylene of various molecular weights, compositions and densities. Such compositions comprised substantially or completely of the polyolefin are useful in their undiluted form for a number of purposes. That is, small amounts of inhibitors, pigments and other conventional additives are usually incorporated into the more or less practically 100 percent polyolefin materials to provide a wider range of usefulness for such polyolefin materials.

Notwithstanding the several benefits which have been accomplished by the incorporation of small amounts of additives in the nature of inhibitors and pigments, such polyolefin materials essentially comprised of either polypropylene or polyethylene have not possessed optimum clarity, impact and other desired properties, particularly at lower temperatures.

Accordingly, it has already been proposed from numerous standpoints to blend various other materials with such polyolefins. That is, it has been proposed in addition to inhibitors and pigments to incorporate polyisobutylene and various so-called synthetic rubber materials and the like ingredients in substantial amounts into polypropylene in an attempt to improve the properties. It has been found that blends of polypropylene and polyethylene are incompatible over a wide composition range; hence, polyethylene even in high concentrations does not appreciably improve the impact strength of the polypropylene. In addition, such blends tend to be opaque and blush when molded pieces are flexed. The impact strength and low-temperature toughness of polypropylene can be improved by blending with 5 to 15 percent ethylene-propylene copolymer rubber, but the resulting blends have undesirably low stiffness and hardness and tend to blush.

It is known, as mentioned above, that elastomers such as polyisobutylene or amorphous ethylene-propylene copolymers improve the impact strength of certain polyethylene-polypropylene blends at low temperatures, but do not significantly improve the impact strength at room temperature or above. The relatively large amounts of elastomer necessary to effect the improvement adversely affects other valuable characteristics of the blend such as stiffness and tensile strength.

Accordingly, it is believed apparent that although a number of useful polypropylene compositions are already available there is a need in the industry for polyolefinic compositions having better clarity, blush resistance and impact properties as will be referred to in detail hereinafter. Therefore, it is believed that providing such new polypropylene blend compositions by the present invention represents a highly desirable result.

After extended investigation we have discovered that certain combinations of crystalline polypropylene, polyethylene, and substantially amorphous ethylene-propylene copolymers or such copolymers containing small amounts of polymerized dicyclopentadiene can be blended together to provide formulations which combine high toughness with high stiffness and, most surprising, with excellent clarity and virtually no tendency to blush. This combination of properties has not been found heretofore in polypropylene-polyethylene blends and could not have been predicted from the prior art. The importance of this discovery is indicated by the fact that there are presently no polypropylene blends or copolymers commercially available which are not limited by excess blushing, inadequate toughness, or low stiffness and hardness. This invention allows for the first time the production of a polypropylene blend formulation which overcomes such type disadvantages.

This invention has for one object to provide new polypropylene-polyethylene type blends having improved compatibility. Another object is to provide high-impact polypropylene type blends having improved clarity and substantially no tendency to blush. Still another object is to provide new polyolefin compositions having high impact strength and high stiffness in combination with good clarity and resistance to blushing. A further object is to provide useful methods for obtaining the aforesaid new blends. Other objects will appear hereinafter.

In the broader aspects of our invention we have found that three polyolefin type components A, B and C as will be specified in greater detail hereinafter may be compounded together. These components which should have certain density characteristics and other specified properties as will be described in detail may be used in an additive-free form. However, for most commercial operations the tri-components may be of the usual commercially available polyolefin materials containing up to about 5 percent of conventional additives. Such additives as is well known in the industry as oxidation inhibitors exemplified by dilauryl 3,3'-thiodipropionate, 2,6-bis(1-methylheptadecyl)-p-cresol, and tris-octylphenyl phosphite, and the ultraviolet inhibitors such as 4-dodecyloxy-2-hydroxybenzophenone. Likewise, in a number of instances in commercial compositions the well known pigments as exemplified by titanium dioxide, carbon black, Cadmium Yellow, Monastral Red Y, and other colored pigments may be present. Other additives which may be found in commercial available polyolefin components A, B and C which may be employed in making the blends of this invention are mold lubricants such as calcium stearate, nucleating agents such as p-tert-butylbenzoic acid and its metal and amine salts, copper inhibitors such as oxanilide, slip agents, antiblocking agents, fillers and the like.

After making or obtaining the suitable three components the correct amount of the three components may then be blended in any one of several ways to secure the desired finished blend. Ways of blending will be set forth in the several examples which follow as well as in description occurring in the latter part of the instant specification. That is, the tri-component blends of this invention are comprised of the following preferred components which can be combined by known blending apparatus and techniques using Banbury mixers, compounding extruders, rubber mills, etc.:

(A) Essentially stereoregular polypropylene
(B) Essentially linear polyethylene
(C) Essentially amorphous ethylene-propylene copolymer In further detail, the preferred properties of the starting components A, B and C are as follows:

(A) POLYPROPYLENE

Density (conditioned sample): ≥0.90; preferred, 0.905–0.920.

Melt flow rate (230° C., 2.16 kg.): 0.1–18.0; preferred, 0.5–10.0.

Note that the polypropylene useful in this invention may be a copolymer or a block polymer conforming to the above specifications and containing minor amounts (<10 percent) of a comonomer such as ethylene, 1-butene, etc.

(B) POLYETHYLENE

Density (conditioned sample): ≥0.91; preferred, 0.95–0.97.

Melt index (190° C.): 0.1–20; preferred, 0.5–10.

Note that the polyethylene useful in the practice of this invention may be a copolymer containing minor amounts (<5 percent) of a comonomer such as 1-butene or other alpha-olefin having less than 10 carbon atoms.

(C) ETHYLENE-PROPYLENE COPOLYMER

Ethylene content: 20–80 wt. percent; preferred; 30–65 wt. percent.

Inherent viscosity (tetralin at 145° C.): 1.0–3.5; preferred, 1.5–3.0.

Second-order transition temperature: ≤—25° C.; preferred, ≤—40° C.

Note that ethylene-propylene terpolymers containing minor amounts (up to 10 wt. percent) of hydrocarbon diene units or other more highly unsaturated hydrocarbon polyene units containing at least one polymerizable double bond or other linear alpha-olefin units are useful in the practice of this invention when they conform to the above specifications.

The proportions of the three components A, B and C used to prepare the tri-component blends of this invention are highly critical. Amounts outside of these limits lead to blends having inferior properties—especially poor transparency or clarity and poor blushing characteristics. The blends of this invention have the following proportions with regard to the three components described above:

| | Percent |
|---|---|
| A—polypropylene | 65–96 |
| B—polyethylene | 2–15 |
| C—ethylene-propylene copolymer | 2–20 |

The preferred blends have the following composition:

| | Percent |
|---|---|
| A—polypropylene | 75–92 |
| B—polyethylene | 5–10 |
| C—ethylene-propylene copolymer | 3–15 |

A further understanding of our new tri-component blends and methods of obtaining such blends will be obtained from the several examples which follow. These examples are set forth in particular to illustrate certain preferred embodiments of our invention.

Examples I to XI

The following materials were blended in a Banbury mixer for six minutes in the proportions in Table 1:

A—Polypropylene having a density of 0.912 and a melt flow of 1.1.

B—Polyethylene having a density of 0.965 and a melt index of 0.73.

C—Ethylene-propylene copolymer containing 47 percent ethylene by weight and having an inherent viscosity of 2.7 and a glass transition temperature of about —56°.

The resulting tri-component blends were injection molded at about 450° F. in a Watson-Stillman machine and were tested for physical properties. These properties are compared in Table 1 with the properties of the polypropylene control and various two-component blends of the polypropylene with the polyethylene and with the ethylene-propylene copolymer.

Examples I through III show the outstanding improvements in the physical properties of polypropylene obtained by means of the tri-component blends of this invention. It can be seen that the impact strength was increased by a factor greater than four with little sacrifice in stiffness and, surprisingly, with an improvement in transparency and blushing resistance. These last two effects are in direct contrast with what would have been predicted from the prior art.

Examples IV and V illustrate the results obtained by operating outside of the limits specified by the invention. These blends, containing polyethylene concentrations greater than specified by this invention, were opaque and blushed badly. It should also be noted by comparison with Example III that increasing the polyethylene content to 20 percent and above caused both the impact strength and the stiffness of the blends to decrease.

Examples VI and VII are prior art type blends showing the effect of an ethylene-propylene copolymer on the properties of polypropylene. The impact strength increased and the stiffness decreased, but the blends showed no improvement in transparency and blushing characteristics as was found in the case of the tri-component blends of Examples I and II.

Examples VIII and IX show the poor results obtained from two-component blends of polypropylene and polyethylene. These results reflect the incompatibility of the two polyolefins.

Examples X and XI show the properties of the unmodified polypropylene and polyethylene, respectively.

TABLE 1

| | Composition of blend, percent | | | Izod impact strength,[1] ft.-lb./in. notch | Stiffness,[2] p.s.i. | Transparency relative to PP | Blushing relative to PP |
|---|---|---|---|---|---|---|---|
| | PP | PE | E/P copolymer | | | | |
| Example: | | | | | | | |
| I | 93 | 2 | 5 | 3.7 | 132,000 | ++++ | ++++ |
| II | 90 | 5 | 5 | 5.1 | 139,000 | ++++ | ++++ |
| III | 85 | 10 | 5 | 6.3 | 140,000 | +++ | +++ |
| IV | 75 | 20 | 5 | 5.9 | 120,000 | + | ++ |
| V | 65 | 30 | 5 | 4.6 | 120,000 | + | + |
| VI | 95 | | 5 | 2.5 | 130,000 | +++ | ++ |
| VII | 90 | | 10 | 5.5 | 110,000 | ++ | ++ |
| VIII | 90 | 10 | | 0.7 | 136,000 | ++ | ++ |
| IX | 80 | 20 | | 0.5 | 130,000 | + | + |
| X | 100 | | | 0.8 | 150,000 | +++ | +++ |
| XI | | 100 | | 7.7 | 98,000 | + | |

[1] ASTM–D256 at 23° C.
[2] ASTM–D747.
NOTE.—PP=Polypropylene; PE=Polyethylene; E/P=Copolymer; + Much inferior;
++ Inferior; +++ Same; ++++ Better.

Results comparable to those in Examples I and II were obtained when the polypropylene used contained 3.9 percent by weight of copolymerized ethylene.

Examples XII to XVII

These examples illustrate the criticality of the density and melt flow rate of the polypropylene in regard to the preparation of the tri-component blends of this invention. In each of these examples, 85 parts of the polypropylene in question was blended in a Banbury mixer with 10 parts of polyethylene (density, 0.955; melt index, 1.0) containing about 1 percent of copolymerized 1-butene and with 5 parts of an ethylene-propylene copolymer (inherent viscosity, 1.7; second-order transition temperature, about −57° C.) containing about 51 percent by weight of ethylene. The resulting blends were injection molded at 450°–475° C. in a Watson-Stillman machine. The physical properties of the blends are shown in Table 2.

In Example XIV, the high melt flow rate of the polypropylene was detrimental to the properties of the blend as shown by the low Izod impact strength and lower transparency relative to that of the unmodified polypropylene.

In Example XVII, it can be seen that polypropylene having a density less than 0.90 led to blends showing low stiffness, low hardness, less transparency than the polypropylene itself, and an undesirable tendency to blush.

On the other hand, the blends of Examples XII, XIII, XV and XVI which were prepared in accordance with this invention showed outstanding impact strength, high stiffness, and transparency and blushing characteristics at least as good as those of the unmodified polypropylene.

TABLE 2

| | PP | | | | | | |
|---|---|---|---|---|---|---|---|
| | Density, gram/cc. | Melt flow, gram/10 min. | Izod impact strength,[1] ft.-lb/in. notch | Stiffness,[2] p.s.i. | Hardness,[3] Rockwell R | Transparency relative to PP | Blushing relative to PP |
| Example: | | | | | | | |
| XII | 0.919 | 0.2 | [4] NB | 127,000 | 64 | +++ | ++++ |
| XIII | 0.914 | 1.4 | [4] NB | 130,000 | 62 | +++ | +++ |
| XIV | 0.914 | 22.0 | 0.6 | 120,000 | 61 | ++ | ++ |
| XV | 0.905 | 1.4 | [4] NB | 121,000 | 58 | +++ | +++ |
| XVI | 0.905 | 3.4 | 2.3 | 137,000 | 64 | +++ | +++ |
| XVII | 0.891 | 3.0 | 2.1 | 95,000 | 39 | ++ | ++ |

[1] ASTM–D256 at 23° C.
[2] ASTM–D747.
[3] ASTM–D785.
[4] Specimens did not break in impact test, NB=no break.
NOTE.—+ Much inferior; ++ Inferior; +++ Same; ++++ Better.

Examples XVIII to XXII

These examples show the desirability of using ethylene-propylene copolymers having properties within the specified limits. In each of these examples, 89 parts of polypropylene (density, 0.910; melt flow, 0.8) and 8 parts of polyethylene (density, 0.961; melt index, 5.5) were blended with 3 parts of the ethylene-propylene copolymer in a Banbury mixer. The blends were then injection molded in a Watson-Stillman machine. The physical properties of these blends are given in Table 3. The blends of Examples XVIII, XXI and XXII were prepared using ethylene-propylene copolymers outside of one or more of the specified limits of ethylene content, inherent viscosity and 2nd-order transition temperature. In these examples, the blends showed relatively low impact strengths in addition to poor blushing characteristics, while the blends of Examples XIX and XX prepared according to this invention showed an outstanding combination of impact strength, stiffness, and transparency in addition to improved blushing characteristics.

TABLE 3

| | EP copolymer | | | | | | |
|---|---|---|---|---|---|---|---|
| | Ethylene, percent | Inherent viscosity | 2nd order Transition, ° C. | Izod impact strength,[1] ft.-lb./in. notch | Stiffness,[2] p.s.i. | Transparency relative to PP | Blushing relative to PP |
| Example: | | | | | | | |
| XVIII | 16 | 2.8 | −30 | 1.5 | 130,000 | +++ | ++ |
| XIX | 26 | 2.4 | −41 | 4.3 | 130,000 | +++ | ++++ |
| XX | 35 | 1.7 | −49 | 6.0 | 127,000 | ++++ | ++++ |
| XXI | 78 | 3.8 | −68 | 2.1 | 120,000 | ++ | + |
| XXII | 26 | 0.8 | −33 | 1.1 | 122,000 | +++ | ++ |

[1] ASTM–D256 at 23° C.
[2] ASTM–D747.
NOTE.—+ Much inferior to polypropylene; ++ Inferior to polypropylene; +++ Same as polypropylene;
++++ Better than polypropylene.

Examples XXIII to XXVIII

These examples show the desirability of using polyethylene having the prperties specified above. In each of these examples, 90 parts of polypropylene (density, 0.914; melt flow, 1.4) and 5 parts of ethylene-propylene copolymer (inherent viscosity, 2.7; second-order transition temperature, about $-55°$ C.) containing 44 percent ethylene by weight were blended with 5 parts of the preferred polyethylene using a Banbury mixer. The blends were then injection molded in a Watson-Stillman machine. The properties of the blends are shown in Table 4.

In Example XXV, the melt index of the polyethylene used was above the specified limits. The resulting tricomponent blend had a relatively low impact strength and did not show the unusual transparency and blushing properties characteristic of the blends of this invention.

Polyethylenes having the properties specified by this invention were used to prepare the blends of Examples XXIII, XXIV, XXVI, XXVII and XXVIII. All of these blends showed an excellent combination of properties not found in prior art blends of polypropylene with polyethylene or with ethylene-propylene copolymers.

Polypropylene—Density, 0.914; melt flow rate, 2.5; birefringence melting point, 170° C.

Polyethylene—Density, 0.945; (Examples XXIX and XXXII) and 0.964 (Examples XXX and XXXIII); melt index, 0.7; birefringence melting point, 132–135° C.

Polyisobutylene [1]—Molecular weight of 80,000.

Ethylene/Propylene copolymer—containing 54 percent (by weight) ethylene; 2nd-order transition, about $-58°$ C.; inherent viscosity, 3.0.

Titanium dioxide—Pigment grade rutile.

[1] Available commercially as Vistanex L80 from Enjay Chemical Co.

It is readily apparent from the data in Table 5 that the preferred tricomponent blend prepared in accordance with this invention (Example XXXIII) has outstanding physical properties and is much superior in this regard to any of the prior-art type polypropylene blends shown in Examples XXIX through XXXII.

TABLE 5

| Example: | Blend composition all parts by weight | Izod impact strength,[1] ft.-lb./in. notch | Stiffness,[2] p.s.i. | Transparency relative to polypropylene | Blushing relative to polypropylene | Flow rate at 230° C. 2.16 kg. |
|---|---|---|---|---|---|---|
| Control | Polypropylene | 0.87 | 162,000 | +++ | +++ | |
| XXIX | Polypropylene, 90<br>Polyethylene, 10 | 0.5 | 139,000 | ++ | ++ | |
| XXX | Polypropylene, 90<br>Polyethylene, 5<br>Polyisobutylene, 5 | 4.3 | 130,000 | ++ | + | |
| XXXI | Polypropylene, 90<br>Ethylene-propylene copolymer, 10 | 5.7 | 130,000 | ++ | ++ | |
| XXXII | Polypropylene, 30<br>Polyethylene, 70<br>Ethylene-propylene copolymer, 2<br>Titanium dioxide, 1 | 3.3 | 115,000 | + | ++ | |
| XXXIII | Polypropylene, 90<br>Polyethylene, 5<br>Ethylene-propylene copolymer, 5 | [3] NB | 160,000 | ++++ | ++++ | 1.08 |

[1] ASTM-D256 at 23° C.
[2] ASTM-D747.
[3] No break, specimens could not be broken in test.
NOTE.—+ Much inferior; ++ Inferior; +++ Same; ++++ Better.

TABLE 4

| | Polyethylene | | Izod impact strength,[2] ft.-lb./in. notch | Stiffness,[3] p.s.i. | Hardness,[4] Rockwell R | Transparency relative to PP | Blushing relative to PP |
|---|---|---|---|---|---|---|---|
| | Density, gram/cc. | Melt index [1] | | | | | |
| Example: | | | | | | | |
| XXIII | 0.970 | 10.0 | 3.8 | 140,000 | 74 | +++ | +++ |
| XXIV | 0.964 | 0.5 | 5.4 | 134,000 | 71 | ++++ | ++++ |
| XXV | 0.964 | 30.0 | 1.8 | 136,000 | 71 | ++ | ++ |
| XXVI | 0.954 | 1.0 | 4.9 | 134,000 | 74 | ++++ | ++++ |
| XXVII | [5] 0.955 | 5.4 | 3.4 | 134,000 | 73 | ++++ | ++++ |
| XXVIII | 0.941 | 3.0 | 3.1 | 126,000 | 62 | +++ | +++ |

[1] ASTM-D1238.
[2] ASTM-D256 at 23° C.
[3] ASTM-D747.
[4] ASTM-D785.
[5] Contains 1-2% copolymerized 1-butene.
NOTE.—+ Much inferior; ++ Inferior; +++ Same; ++++ Better.

Examples XXIX to XXXIII

These examples illustrate the advantage of the blends of this invention over the various polypropylene blends described in the prior art. All of the blends described below were prepared using a Banbury mixer. Each blend was then injection molded in a Reed-Prentice machine equipped with a Battenfeld screw preplasticizer in accordance with ASTM D2146-63T and was subjected to physical properties tests. The test results are shown in Table 5. The polymeric materials used in preparing the blends of these examples had the following properties:

Examples XXXIV to XXXIX

These examples illustrate the unusual combinations of properties afforded by the tri-component blends of this invention. All of the blends described below were prepared using a Banbury mixer. Physical test specimens were molded on a Watson-Stillman machine and aged 7 days before testing.

The following materials were used to prepare the blends described in these examples:

Polyallomer—Highly crystalline, block copolymers of propylene and ethylene containing about one percent ethylene; density, 0.904; melt flow rate, 2.5.

Polyethylene—Density, 0.964; melt index, 0.7.

Ethylene/Propylene copolymer—containing 47 percent ethylene by weight; inherent viscosity, 2.7; 2nd-order transition temperature, about −56° C.

These examples show the similarity in physical properties observed in tricomponent blends prepared with various types of polyethylene in accordance with the specifications of this invention.

Example XLIV

This example illustrates the use of an ethylene-propyl-

TABLE 6.—PHYSICAL PROPERTIES OF TRICOMPONENT BLENDS FROM POLYALLOMER, POLYETHYLENE, AND EPR [1]

| | Example | | | | | |
|---|---|---|---|---|---|---|
| | XXXIV | XXXV | XXXVI | XXXVII | XXXVIII | XXXIX |
| | Tricomponent blend | | | | | Polyallomer |
| Weight proportions, PA/PE/EPR | 90/5/5 | 85/5/10 | 80/5/15 | 85/10/5 | 80/15/5 | |
| Melt flow rate, degree/min., ASTM–D1238 | 2.2 | 2.1 | 2.1 | 1.9 | 1.7 | 2.5 |
| Hardness: | | | | | | |
| Rockwell R, ASTM–D785 | 47 | 50 | 44 | 32 | | 63 |
| Shore durometer D, ASTM–D676 | 66 | 65 | 65 | 63 | 60 | 65 |
| Tensile strength, ASTM–D638: | | | | | | |
| Yield, $10^3$ p.s.i | 4.0 | 4.3 | 4.1 | 3.7 | 3.3 | 4.6 |
| Break, $10^3$ p.s.i | 4.6 | 4.8 | 4.8 | 4.4 | 4.1 | 4.0 |
| Elongation, percent | 434 | 484 | 475 | 441 | 446 | 428 |
| Stiffness, $10^5$ p.s.i., ASTM–D747 | 0.75 | 0.74 | 0.75 | 0.68 | 0.58 | 0.90 |
| Izod impact strength notched, 23° C., ft.-lb./in., ASTM–D256 | [2] | [2] | [2] | [2] | [2] | 1.3 |
| Heat distortion temperature, 66 p.s.i., ° C.[3] | 149 | 147 | 148 | 147 | 149 | 152 |

[1] Specimens were molded on a Watson-Stillman machine and aged 7 days before testing.
[2] No break.
[3] Modern Plastics, 34, No. 3, 169 (1956).

It can be seen that the tri-component polyallomer blends have outstanding impact strengths obtained with little or no sacrifice in the tensile strength and heat distortion temperature of the unmodified polyallomer.

Examples XL to XLIII

These examples show the properties of tri-component blends prepared from various types of polyethylene; that is, low-, medium-, and high-density polyethylenes. All of the blends described in these examples were prepared using a Banbury mixer. Physical test specimens were molded on a Watson-Stillman machine and aged 7 days before testing.

The following materials were used to prepare the blends described in these examples:

| | Parts |
|---|---|
| Polypropylene—Density, 0.909; melt flow rate, 2.0 | 90 |
| Polyethylene—Type indicated in table | 5 |
| Ethylene/Propylene copolymer—containing 47 percent ethylene by weight; inherent viscosity, 2.7; 2nd-order transition temperature, about −56° C. | 5 | ene terpolymer in the preparation of tricomponent blends.

The following materials were blended together in a Banbury mixer for six minutes. The resulting blend was granulated and then injection molded into test specimens on a Watson-Stillman machine. The test specimens were aged 7 days before testing.

| | Parts |
|---|---|
| Polypropylene—Density, 0.909; melt flow rate, 10 | 75 |
| Polyethylene—Density, 0.064; melt index, 0.7 | 10 |
| Ethylene/propylene terpolymer containing about 2.5% (by weight) of terpolymerized dicyclo-pentadiene and about 47% (by weight) of ethylene—Inherent viscosity, 2.5 | 15 |

In the table below, the physical properties of the tri-component blend are compared with the properties of two commercially available prior art high-impact polypropylene formulas having comparable melt flow rates.

TABLE 7.—EFFECT OF TYPE OF POLYETHYLENE ON THE PHYSICAL PROPERTIES OF 90/5/5 POLYPROPYLENE/POLYETHYLENE/EPR TRICOMPONENT BLENDS [1]

| | Example | | | |
|---|---|---|---|---|
| | XL | XLI | XLII | XLIII |
| | Tricomponent blend | | | |
| Polyethylene used | Low density, 0.915 | Medium density, 0.935 | High-density, 0.964 | Polypropylene |
| Melt flow rate, degree/min., ASTM–D1238 | 2.0 | 2.2 | 2.1 | 2.0 |
| Hardness: | | | | |
| Rockwell R, ASTM–D785 | 68 | 67 | 74 | 84 |
| Shore durometer D, ASTM–D676 | 67 | 68 | 67 | 71 |
| Tensile strength, ASTM–D638: | | | | |
| Yield, $10^3$ p.s.i | 5.6 | 5.1 | 5.6 | 6.0 |
| Break, $10^3$ p.s.i | 4.4 | 4.8 | 4.3 | 4.5 |
| Elongation, percent | 154 | 350 | 131 | 148 |
| Stiffness, $10^5$ p.s.i., ASTM–D747 | 1.00 | 1.10 | 1.22 | 1.30 |
| Izod impact strength notched, 23° C., ft.-lb./in., ASTM–D256 | 1.80 | 1.60 | 1.90 | 0.64 |
| Brittleness temperature, ° C., ASTM–D746 | −28 | −25 | | −11 |
| Heat distortion temperature, 66 p.s.i., ° C.[2] | 158 | 167 | 163 | 167 |

[1] Specimens were molded on a Watson-Stillman machine and aged 7 days before testing.
[2] Modern Plastics, 34, No. 3, 169 (1956).

TABLE 8

|  | Tricomponent blend, Example XLIV | Prior art formula | |
| --- | --- | --- | --- |
|  |  | A | B |
| Melt flow rate, degree/min., ASTM-D1238 | 4.9 | 4.0 | 4.7 |
| Hardness, Rockwell R, ASTM-D785 | 70 | 81 | 74 |
| Tensile strength, ASTM-D638: |  |  |  |
| Yield, 10³ p.s.i. | 4.5 | 3.9 | 3.8 |
| Break, 10³ p.s.i. | 4.6 | 3.0 | 2.5 |
| Elongation, percent | 492 | 560 | 190 |
| Stiffness, 10⁵ p.s.i., ASTM-D747 | 1.00 | 1.10 | 1.20 |
| Izod impact strength, notched, 23° C., ft.-lb./in., ASTM-D256 | 3.2 | 2.5 | 2.3 |
| Blush resistance | Good | Fair | Poor |

It can be seen that the high-flow rate tricomponent blend has a superior balance of toughness, strength and rigidity than shown by the best prior art high-flow-rate formulas.

Example XLV

Example XLIV was repeated except that the ethylene-propylene terpolymer contained 1,4-hexadiene units instead of dicyclopentadiene units. The resulting tricomponent blend showed essentially the same physical properties as that obtained in Example XLIV. Commercially available ethylene-propylene terpolymers which gave similar results are EPT 3509 (Enjay Company, Inc.) and Nordel 1070 (E. I. du Pont de Nemours and Co., Inc.).

Example XLVI

Example XLIV when repeated except that the ethylene/propylene/dicyclopentadiene terpolymer is replaced by an ethylene/propylene/1-butene terpolymer containing about 47% (by weight) of ethylene and 8% (by weight) of 1-butene gives a tricomponent blend showing essentially the same physical properties as that obtained in Example XLIV.

Example XLVII

The following materials were blended in a Banbury mixer for six minutes, cooled, and granulated:

|  | Parts |
| --- | --- |
| Propylene/1-butene copolymer containing 8% (by weight) 1-butene and having a density of 0.903 and a melt flow rate of 14 | 90 |
| Polyethylene having a density of 0.965 and a melt index of 0.73 | 5 |
| Ethylene-propylene copolymer containing 47 percent ethylene by weight and having an inherent viscosity of 2.7 and a second-order transition temperature of about −56° C. | 5 |

The resulting high-flow-rate tricomponent blend was injection molded at about 450° F. in a Watson-Stillman machine and was tested for physical properties. These properties are compared in Table 9 with the properties of the unmodified propylene/1-butene copolymer in order to show the improved balance of toughness, strength and rigidity afforded by the tricomponent blend.

TABLE 9

|  | Tricomponent blend | 92/8 propylene/1-butene copolymer |
| --- | --- | --- |
| Melt flow rate, degree/min., ASTM-D1238 | 10.8 | 14 |
| Hardness, Rockwell R, ASTM-D785 | 60 | 79 |
| Tensile strength, ASTM-D638: |  |  |
| Yield, 10³ p.s.i. | 4.1 | 3.5 |
| Break, 10³ p.s.i. | 4.0 | 3.5 |
| Elongation, percent | 516 |  |
| Stiffness, 10⁵ p.s.i., ASTM-D747 | 0.67 | 0.70 |
| Izod impact strength, notched, 23° C., ft.-lb./in., ASTM-D256 | 1.4 | 1.0 |

Similar results were obtained when the propylene/1-butene copolymer was replaced by an ethylene/propylene copolymer containing 5.8% ethylene by weight.

Similar results were also obtained when the polyethylene used in the above tricomponent blend was replaced with an ethylene/propylene copolymer containing 0.5% of propylene by weight.

An additional and highly valuable property of such tricomponent blends shown in Examples XLIV through XLVI is their remarkable adhesion to electroplated metals such as nickel and copper deposited by various metal plating techniques as described, for example, in pending application Ser. No. 677,876 filed Oct. 25, 1967 by Raymond E. Sutherland, titled Metal Plate Thermoplastic Articles.

The following Examples XLVIII and XLIX show the advantage of using a crystalline ethylene copolymer in place of crystalline polyethylene in a high-flow-rate tricomponent blend. The blends described in these examples were prepared using a Banbury mixer. Physical test specimens were injection molded.

The following materials were used to prepare the blends described in these examples:

|  | Parts |
| --- | --- |
| Polypropylene—Density 0.902; melt flow rate, 4.5 | 38 |
| Polypropylene—Density 0.902; melt flow rate, 9 | 38 |
| Polyethylene—Type indicated in table | 9 |
| Amorphous ethylene/propylene copolymer—containing 47% ethylene by weight; inherent viscosity, 2.7 | 15 |

|  | Example | |
| --- | --- | --- |
|  | XLVIII | XLIX |
| Polyethylene used | Homopolymer [1] | Crystalline copolymer [2] |
| Melt flow rate, degree/min., ASTM-D1238 | 4.4 | 4.5 |
| Tensile strength, ASTM-D638 at: |  |  |
| Fracture, p.s.i. | 2,800 | 2,850 |
| Yield, p.s.i. | 3,450 | 3,450 |
| Elongation at fracture, percent | 600 | 600 |
| Stiffness in flexture, p.s.i. | 105,000 | 120,000 |
| Notched Izod impact strength at 23° C., ft.-lb./in. notch, hinge | 2.7 | 3.3 |
| Unnotched Izod impact strength, ft.-lb./in. width at: |  |  |
| 23° C. | ([3]) | ([3]) |
| −18° C. | [4] 33.9 | [5] 34.8 |

[1] High-density polyethylene; melt index 0.7; density, 0.96.
[2] Crystalline ethylene copolymer containing 1-2%, 1-butene; melt index 0.8; density, 0.95.
[3] No break.
[4] Complete breaks.
[5] Partial breaks.

It is evident from these data that the crystalline ethylene copolymer of Example XLIX in comparison with the unmodified high-density polyethylene of Example XLVIII affords blends having a superior combination of stiffness and toughness (impact strength) at a given melt flow rate (indicative of similar processabilities) without sacrificing the tensile properties of the blend. These results are surprising, since one would not expect a copolymer (ethylene/1-butene) to give a blend having higher stiffness than that obtained using a crystalline homopolymer (linear polyethylene).

Similar behavior is observed when the blends are derived from a crystalline propylene copolymer instead of polypropylene.

In the above examples the time of blending was either the specific time stated in the example or for a period of 6 to 10 minutes in the Banbury mixer or other intensive mixing apparatus used. The Banbury mixer is preferred for preparing the blends of this invention, but certain screw extruders, especially the dual extruders and double screw extruders, can be used. These mixers are discussed in Crystalline Olefin Polymers (Raff and Doak, Editors), Part II, Interscience Publishers, New York, N.Y., 1964, pp. 408–422.

In other words, the apparatus we employed in blending was highly efficient equipment. Therefore, only a period of a few minutes is generally required to secure a homogeneous and uniform blend of components A, B and C. The adequacy of the blending of the tri-components when preparing blends in accordance with the present invention can be determined by examining the uniformity of a thin film of the blend by means of a high-resolution interference microscope (e.g., Leitz). A uniform distribution of the blend components in a highly dispersed form is required for optimum results.

As apparent from the foregoing it is desirable that the tri-components A, B, and C of the present invention be reasonably interdispersed before the composition is subjected to molding operations. It is thought further apparent from the foregoing that although we refer to a tri-component blend such does not preclude the presence of small amounts of inhibitors, pigments or other usual and conventional additives. The tri-components, as may be seen from the several examples presented above, characterize the main or principal basic structure of the new blends of this invention.

The composition of this invention show one or more of the following important commercial advantages over prior art compositions of several components:

(a) Increased clarity of molded objects.
(b) Greatly reduced tendency to blush in molded objects.
(c) Increased stiffness, hardness, and tensile yield strength.
(d) Greatly increased impact strength at room temperature.
(e) Rheological properties very similar to unmodified polypropylene.
(f) Improved dimensional stability.
(g) Improved electroplatability and adhesion to the metal plate.

Accordingly, the ternary blends of this invention are useful in all injection molding, blow molding, extrusion, and vacuum forming applications requiring high impact strength at both room and low temperatures together with high stiffness, good clarity, and little or no blushing. No high-impact polypropylene composition meeting all of these important industrial requirements has been available prior to this invention.

Although the invention has been described in detail with reference to preferred embodiments thereof, it will be understood that variations and modifications can be effected within the spirit and scope of the invention as described hereinabove and as defined by the appended claims.

We claim:

1. As a new composition of matter a polyolefinic tri-component blend capable of being molded into products of excellent clarity and resistance to blushing, said blend comprising (A) from about 65 to about 96 percent by wt. of a crystalline polymer having a density greater than 0.90 and a melt flow of 0.1 to 18.0 selected from the group consisting of polypropylene, block- and copolymers of propylene with less than 10% by weight alpha-olefin; (B) from about 2 to about 15 percent by wt. of a polymer of ethylene having a density greater than 0.91 and a melt index of 0.1 to 20 selected from polyethylene and copolymers of ethylene containing less than 5% by weight of alpha-olefin containing less than ten carbon atoms; and (C) from about 2 to about 20 percent by wt. of a terpolymer of ethylene, propylene and up to 10% by weight of an unsaturated hydrocarbon containing at least 1 double bond and having a inherent viscosity of 1.0 to 3.5, said terpolymer having an ethylene content of 20 to 80%.

2. The composition of claim 1 wherein the polymer of ethylene has a density of from 0.97 to 0.95 and a melt index of 0.5 to 10.

3. The composition of claim 1 wherein the polymer of ethylene contains up to 5 percent of copolymerized 1-butene.

4. The composition of claim 1 wherein said terpolymer is an ethylene-propylene copolymer exhibiting a second-order transition temperature not higher than −25° C.

5. The composition of claim 1 wherein the proportions by weight of the crystalline polymer, polymer of ethylene, and terpolymer are within the ranges of 75–92 percent, 5–10 percent and 3–15 percent, respectively.

6. The composition of claim 1 wherein said terpolymer is a terpolymer of ethylene, propylene and a hydrocarbon diene.

7. The composition of claim 1 wherein the crystalline polymer has a density of 0.905 to 0.920 and a melt flow rate of from 0.5 to 10.

8. The composition of claim 1 wherein the crystalline polymer contains up to 5 percent of copolymerized ethylene.

9. In the process of manufacturing molded articles from polyolefinic compositions wherein said articles possess higher clarity and improved impact strength over a wider range of temperatures, the steps which comprise homogeneously blending together components A, B and C of the composition of claim 1 and subjecting the resultant blend to a molding operation.

10. As a new article of manufacture a molded product consisting essentially of components A, B and C of the composition of claim 1, said molded product being characterized in its high blushing resistance and high Izod impact strength over a relatively wide temperature range including room temperature.

11. As a new composition of matter a polyolefinic tri-component blend capable of being molded into products of excellent clarity and resistance to blushing said blend comprising (A) from about 65 to about 96% by weight of a crystalline polypropylene; (B) from about 2 to about 15% by weight of a polymer selected from polyethylene and copolymers of ethylene containing less than 5% alpha-olefin containing less than 10 carbon atoms; and (C) from about 2 to about 20% by weight of an amorphous terpolymer of ethylene, propylene and up to 10% of an unsaturated hydrocarbon containing at least one double bond, said terpolymer having an ethylene content of about 20 to 80%.

12. The composition of claim 11 wherein the unsaturated hydrocarbon is a hydrocarbon diene.

13. The composition of claim 12 wherein the hydrocarbon diene is dicyclopentadiene.

14. The composition of claim 11 wherein the proportions by weight of the crystalline polymer, polymer of ethylene, and amorphous terpolymer are within the ranges of 75–92%, 5–10% and 3–15%, respectively.

15. As a new composition of matter a polyolefinic tri-component blend capable of being molded into products of excellent clarity and resistance to blushing, said blend comprising (A) from about 65 to about 96% by weight of a crystalline polymer selected from block- and copolymers of propylene containing less than 10% of another alpha-olefin; (B) about 2 to 15% by weight of a copolymer of ethylene containing less than 5% of alpha-olefin having less than 10 carbon atoms; and (C) about 2 to 20% by weight of an amorphous terpolymer of ethylene, propylene and up to 10% of an unsaturated hydrocarbon containing at least one double bond, said terpolymer having an ethylene content of 20 to 80%.

16. A composition of claim 15 wherein the proportions by weight of the crystalline polymer, polymer of ethylene, and amorphous terpolymer are within the ranges of 75–92%, 5–10% and 3–15%, respectively.

17. In the process of manufacturing molded articles from polyolefinic compositions wherein said articles possess higher clarity and improved impact strength over a wider range of temperatures, the steps which comprise homogeneously blending together components A, B and C of the composition of claim 11 and subjecting the resultant blend to a molding operation.

18. In the process of manufacturing molded articles from polyolefinic compositions wherein said articles possess higher clarity and improved impact strength over a wider range of temperatures, the steps which comprise homogeneously blending together components A, B and C of the composition of claim 15 and subjecting the resultant blend to a molding operation.

19. As a new article of manufacture a molded product consisting essentially of components A, B and C of the composition of claim 11, said molded product being characterized in its high blushing resistance and high Izod impact strength over a relatively wide temperature range including room temperature.

20. As a new article of manufacture a molded product consisting essentially of components A, B and C of the composition of claim 15, said molded product being characterized in its high blushing resistance and high Izod impact strength over a relatively wide temperature range including room temperature.

References Cited

UNITED STATES PATENTS

| 3,256,367 | 6/1966 | Tayne | 260—897 |
| 3,358,053 | 12/1967 | Hostetler | 260—876B |
| 3,478,128 | 11/1969 | Hagemeyer et al. | 260—876B |

SAMUEL H. BLECH, Primary Examiner

H. ROBERTS, Assistant Examiner

U.S. Cl. X.R.

264—181; 260—41, 41.5, 889, 897